United States Patent
Adachi et al.

(10) Patent No.: US 8,259,589 B2
(45) Date of Patent: Sep. 4, 2012

(54) NETWORK RELAY DEVICE, NETWORK CONNECTION CONFIRMATION METHOD, AND NETWORK

(75) Inventors: Daisuke Adachi, Tsuchiura (JP); Koichiro Seto, Amimachi (JP)

(73) Assignee: Hitachi Cable, Ltd., Tokyo (JP)

( * ) Notice: Subject to any disclaimer, the term of this patent is extended or adjusted under 35 U.S.C. 154(b) by 180 days.

(21) Appl. No.: 12/659,345

(22) Filed: Mar. 4, 2010

(65) Prior Publication Data

US 2010/0278188 A1   Nov. 4, 2010

(30) Foreign Application Priority Data

Apr. 30, 2009   (JP) .................................. 2009-110852

(51) Int. Cl.
*G06F 11/00* (2006.01)
*H04J 1/16* (2006.01)
*H04L 1/00* (2006.01)

(52) U.S. Cl. ..................... 370/241.1; 370/242

(58) Field of Classification Search ................ 370/241.1, 370/241, 242
See application file for complete search history.

(56) References Cited

U.S. PATENT DOCUMENTS

| 5,710,760 A | 1/1998 | Moll | |
| 7,995,483 B1 * | 8/2011 | Bayar et al. ................. | 370/241.1 |
| 8,059,549 B2 * | 11/2011 | Soon et al. .................... | 370/242 |
| 2007/0268817 A1 * | 11/2007 | Smallegange et al. ........ | 370/216 |
| 2008/0219173 A1 * | 9/2008 | Yoshida et al. ............ | 370/241.1 |
| 2008/0259807 A1 * | 10/2008 | Yan ................................ | 370/242 |
| 2009/0213759 A1 | 8/2009 | Kitajima | |
| 2010/0172245 A1 * | 7/2010 | Sridhar et al. ................ | 370/242 |
| 2010/0188983 A1 * | 7/2010 | Washam et al. ............... | 370/245 |
| 2010/0208593 A1 * | 8/2010 | Soon et al. .................... | 370/242 |
| 2010/0238808 A1 * | 9/2010 | Salam et al. ............... | 370/241.1 |
| 2011/0090783 A1 * | 4/2011 | Huang .......................... | 370/217 |

FOREIGN PATENT DOCUMENTS

| JP | 9-181741 A | 7/1997 |
| JP | 2008-244689 | 10/2008 |

OTHER PUBLICATIONS

Japanese Office Action date Jun. 5, 2012, with an English language translation thereof.

* cited by examiner

*Primary Examiner* — Chuong T Ho
(74) *Attorney, Agent, or Firm* — McGinn IP Law Group, PLLC

(57) ABSTRACT

A network relay device is for receiving, from an external network relay device, connection confirmation information indicative of being in communication connection with the external network relay device. When the connection confirmation information is particular connection confirmation information indicative of being transmitted from a predetermined external network relay device, the network relay device provides return confirmation information to the predetermined external network relay device.

13 Claims, 7 Drawing Sheets

FIG.2

| DA (6B) | SA (6B) | S-TAG (4B) | Ether Type (2B) | MD Level + version (1B) | OP code (1B) | Flags (1B) | TLV offset (1B) | Data | END TLV (1B) | FCS (4B) |

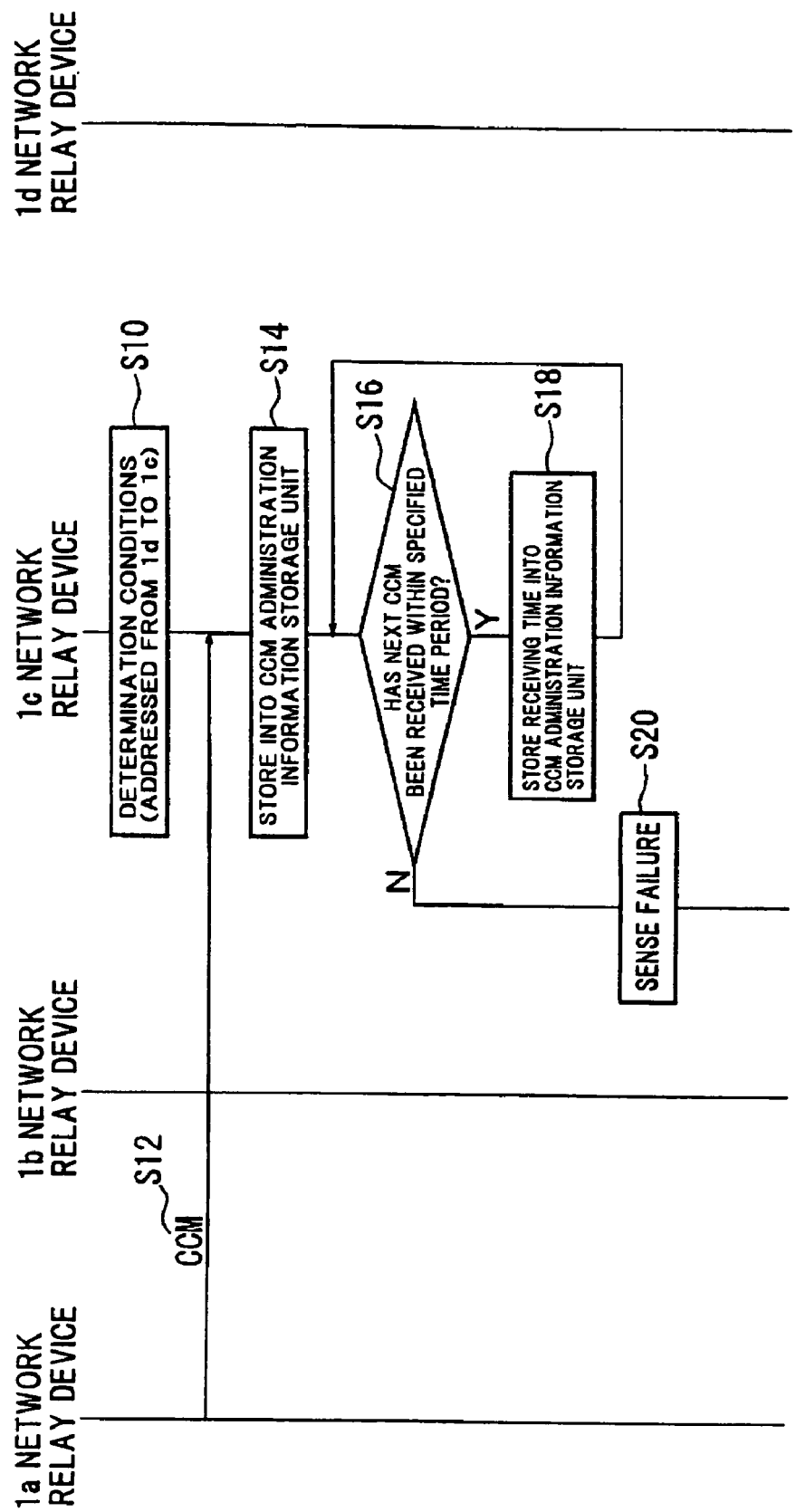

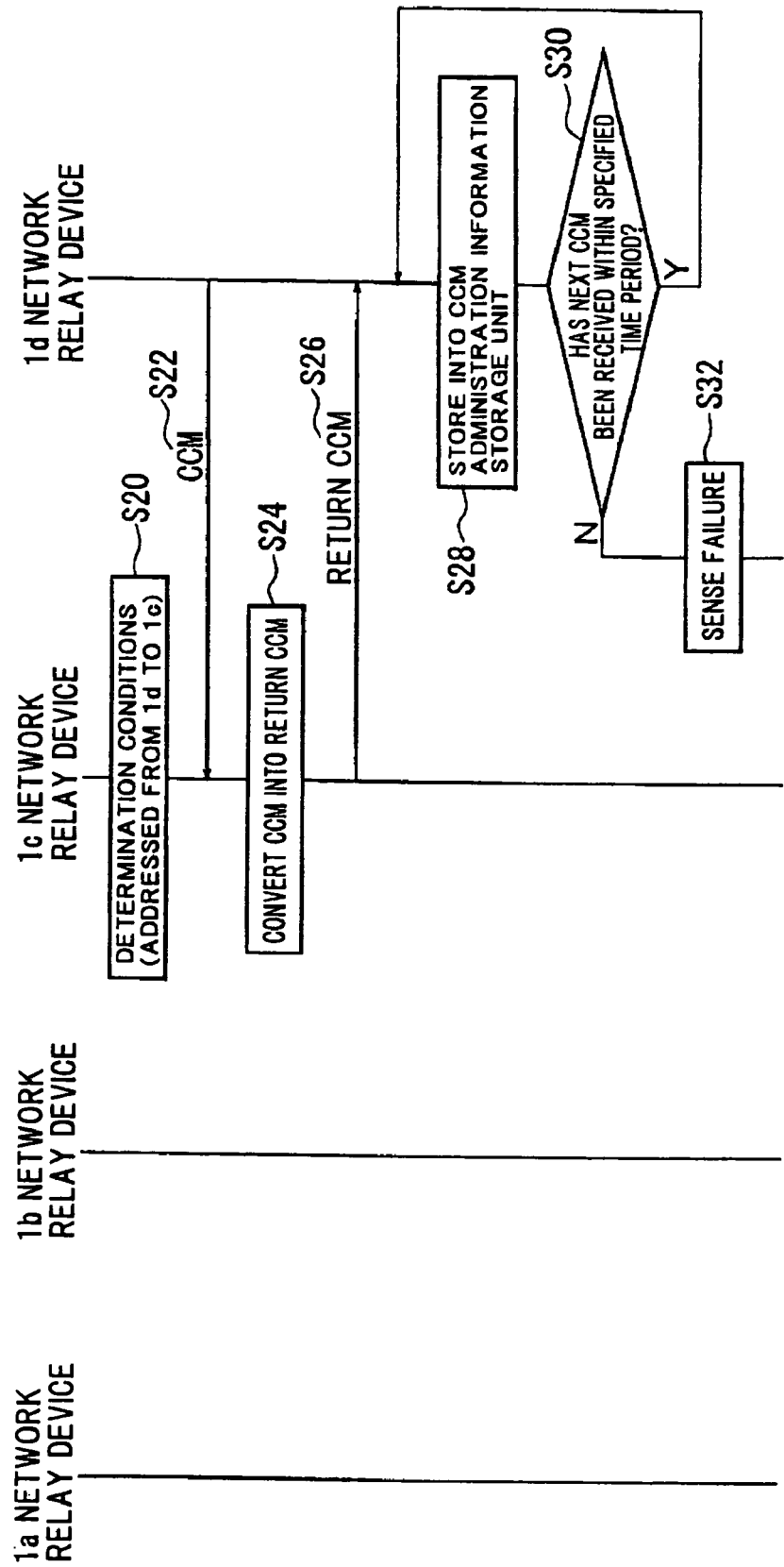

NETWORK RELAY DEVICE, NETWORK CONNECTION CONFIRMATION METHOD, AND NETWORK

The present application is based on Japanese patent application No. 2009-110852 filed on Apr. 30, 2009, the entire contents of which are incorporated herein by reference.

BACKGROUND OF THE INVENTION

1. Field of the Invention

The present invention relates to a network relay device, a network connection confirmation method, and a network. In particular, it relates to a network relay device, a network connection confirmation method, and a network using an Ethernet OAM continuity check function.

2. Description of the Related Art

Ethernet developed as a local area network (LAN) technology is also used for wide area networks. The use of LANs in the wide area networks requires the stability of communications. Accordingly, an Ethernet operation, administration and maintenance (OAM) function has been specified in ITU-T Y. 1731 and IEEE802.1ag.

Conventionally, a network administration system is known that, in a network topology formed by Ethernet connecting a plurality of nodes, collects, from each of the plural nodes, received result information based on a continuity check (herein, referred to as "CC") that is connection confirmation information transmitted or received by each of the plural nodes, VLAN setting information, and port MAC information, to create a network topology.

With the above function, this network administration system allows the use of only information of the plural nodes each connected in the network, to create network topology information.

Refer to JP-A-2008-244689, for example.

With large scale network construction, however, the network administration system disclosed by JP-A-2008-244689 is increased in the number of other nodes transmitting a CC to a node. In the above network administration system, CCs received by a node are software processed in a central control unit provided at that node. The load of that central control unit is therefore increased with the number of CCs received by that node. This may interfere with operation of that central control unit.

SUMMARY OF THE INVENTION

Accordingly, it is an object of the present invention to provide a network relay device, a network connection confirmation method, and a network, capable of load reduction in connection confirmation information processing.

(1) According to one embodiment of the invention, a network relay device is for receiving, from an external network relay device, connection confirmation information indicative of being in communication connection with the external network relay device, and when the connection confirmation information is particular connection confirmation information indicative of being transmitted from a predetermined external network relay device, providing return confirmation information to the predetermined external network relay device.

In the above embodiment (1), the following modifications and changes can be made.

(i) The network relay device comprises:

a transmit/receive unit for transmitting/receiving the connection confirmation information;

a frame determination unit for determining whether or not the connection confirmation information received in the transmit/receive unit is the particular connection confirmation information; and a forwarding control unit for, when the frame determination unit determines that the connection confirmation information is the particular connection confirmation information, providing the return confirmation information to the predetermined external network relay device.

(ii) The network relay device further comprises:

a frame conversion unit for, when the frame determination unit determines that the connection confirmation information is the particular connection confirmation information, generating the return confirmation information from the particular connection confirmation information; and the forwarding control unit transmitting the return confirmation information generated by the frame conversion unit, from the transmit/receive unit to the predetermined external network relay device.

(iii) The connection confirmation information contains source identification information for identifying a source having transmitted the connection confirmation information, and destination identification information for identifying a destination, and when the destination identified by the destination identification information is that network relay device, and the source identified by the source identification information is the predetermined external network relay device, the frame determination unit determines that the connection confirmation information is the particular connection confirmation information, and when the destination identified by the destination identification information is that network relay device, and the source identified by the source identification information is not the predetermined external network relay device, the frame determination unit determines that the connection confirmation information is not the particular connection confirmation information.

(iv) The frame determination unit and the frame conversion unit are constructed of hardware.

(2) According to another embodiment of the invention, a network connection confirmation method comprises:

in a transmit/receive unit for transmitting/receiving connection confirmation information indicative of being in communication connection with an external network relay device, receiving the connection confirmation information;

determining whether or not the connection confirmation information received in the transmit/receive unit is particular connection confirmation information indicative of being transmitted from a predetermined external network relay device; and when it is determined that the connection confirmation information is the particular connection confirmation information, providing return confirmation information to the predetermined external network relay device.

In the above embodiment (2), the following modifications and changes can be made.

(v) The network connection confirmation method further comprises:

when it is determined that the connection confirmation information is the particular connection confirmation information, generating the return confirmation information from the particular connection confirmation information, wherein the return confirmation information providing step includes transmitting the generated return confirmation information, from the transmit/receive unit to the predetermined external, network relay device.

(vi) The connection confirmation information contains source network relay device identification information for identifying the external network relay device having transmitted the connection confirmation information, and destination network relay device identification information for identifying a destination network relay device, and when the destination network relay device identified by the destination network relay device identification information is that network relay device, and the source network relay device identification information is the predetermined external network relay device, it is determined that the connection confirmation information is the particular connection confirmation information, and when the destination network relay device identified by the destination network relay device identification information is that network relay device, and the source network relay device identification information is not the predetermined external network relay device, it is determined that the connection confirmation information is not the particular connection confirmation information.

(3) According to another embodiment of the invention, a network comprises;

a plurality of connected network relay devices; and one network relay device receiving connection confirmation information indicative of being in communication connection between the one network relay device and another network relay device, and when the connection confirmation information is particular connection confirmation information indicative of being transmitted from another predetermined network relay device, providing return confirmation information generated from the particular connection confirmation information to the other predetermined network relay device.

POINTS OF THE INVENTION

According to one embodiment of the invention, a network with a network relay devices allows a CCM from a predetermined network relay device to be processed by a central control unit, while allowing a CCM from a particular network relay device to be returned to that particular network relay device by a frame conversion unit and a forwarding control unit, which are constructed of hardware. This allows the network with the network relay devices to reduce the number of CCMs to be processed by the central control unit, therefore reducing the load of the central control unit. Thus, the use of the network relay devices allows the load of the central control unit to be reduced even when the network relay devices constitute a large scale network.

BRIEF DESCRIPTION OF THE DRAWINGS

The preferred embodiments according to the invention will be explained below referring to the drawings, wherein:

FIG. 2 is a diagram showing a frame data format for the network relay device in the embodiment according to the invention;

FIG. 5A is a diagram showing flows of a network connection confirmation method in the embodiment according to the invention;

FIG. 5B is a diagram showing flows of a network connection confirmation method in the embodiment according to the invention.

DETAILED DESCRIPTION OF THE PREFERRED EMBODIMENTS

Figure 1:
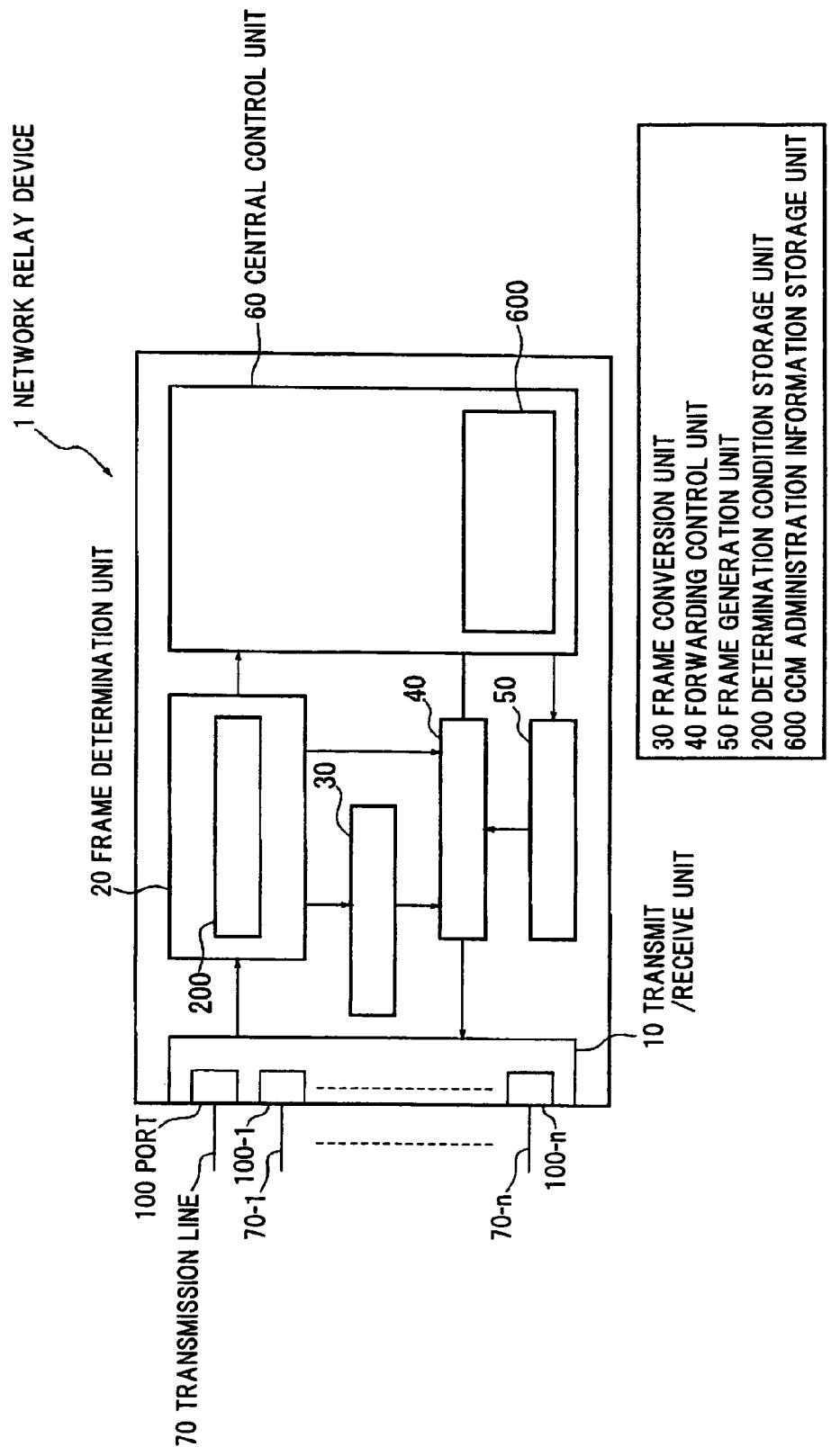
FIG. 1 is a block diagram showing a function and construction of a network relay device in an embodiment according to the invention.

FIG. 1 shows one example of a block diagram showing a function and construction of a network relay device in an embodiment according to the invention. Also, FIG. 2 shows one example of a frame data format for the network relay device in the embodiment according to the invention.

The network relay device 1 in this embodiment has a continuity check (herein, referred to as "CC") function specified in ITU-T Y. 1731 and IEEE802.1ag, for example. Specifically, the network relay device 1 serves as a maintenance end point (herein, also referred to as "MEP") for receiving, from an external network relay device, connection confirmation information (herein, referred to as a "continuity check message (CCM)") indicative of being in communication connection with the external network relay device, and when the CCM is particular connection confirmation information indicative of being transmitted from a predetermined external network relay device, providing return confirmation information (herein, referred to as a "return CCM") generated by rewriting the contents of the particular connection confirmation information, to that predetermined external network relay device.

Network Relay Device 1 Construction

The network relay device 1 in this embodiment includes a transmit/receive unit 10 for receiving information (e.g. a frame) from an external network relay device and/or an external network, or providing information from the network relay device 1 to an external network relay device and/or an external network; a frame determination unit 20 for referencing the information received in the transmit/receive unit 10 and determining whether or not it satisfies predetermined determination conditions; a frame conversion unit 30 for generating a return CCM based on the determined result of the frame determination unit 20; a forwarding control unit 40 for providing a frame such as the return CCM to the external network relay device through the transmit/receive unit 10; a frame generation unit 50 for generating a frame such as a CCM; and a central control unit 60 for controlling the operation of the forwarding control unit 40, and of the frame generation unit 50.

Frame Data Format

Here, referring to FIG. 2, the information, i.e. the frame transmitted/received between the network relay devices in this embodiment is an Ethernet OAM frame standardized in ITU-T as Y. 1731, for example. This frame is configured to have each field of a destination address (DA) as destination identification information for uniquely identifying a destination, a source address (SA) as source identification information for uniquely identifying a source, a service VLAN tag (S-TAG), an Ether type for storing an Ethernet OAM identification value, a maintenance domain (MD) level plus version (=MD level+version), an operation code (OP code), flags (Flags), a type/length/value offset (TLV offset), data (Data), an end TLV (END TLV), and a flame check sequence (FCS).

Below is described one example where the information to be managed in the network relay device 1 is an Ethernet OAM frame.

Transmit/Receive Unit 10

The transmit/receive unit 10 has a plurality of ports (e.g. port 100, port 100-1, . . . , port 100-*n*, where n is positive integers) communicatably connected to an external network relay device and/or an external network. The plural ports are connected to transmission lines, respectively, for transmitting/receiving information between them and the external network relay device and/or the external network. Specifically, the port 100 is connected to a transmission line 70, and the port 100-1 is connected to a transmission line 70-1. The ports 100-*n* are likewise connected to transmission lines 70-*n*, respectively. In this embodiment, the plural transmission lines each are constructed from an optical fiber, for example, and configured to include at least two transmission lines. That is to say, although for convenience of description, each transmission line is depicted as being one line in FIG. 1, the plural transmission lines each are configured to include a two-way (i.e. two directions of transmitting and receiving) transmission line, to allow full duplex communications between the external network relay device and/or the external network and the network relay device 1.

The transmit/receive unit 10 provides the information (e.g. CCM) received from the external network relay device and/or the external network, from each of the plural ports to the frame determination unit 20. Also, the transmit/receive unit 10 provides the information from the forwarding control unit 40, from a specified port to the specified external network relay device and/or the external network through a transmission line.

Frame Determination Unit 20

The frame determination unit 20 determines whether or not the CCM received in the transmit/receive unit 10 is particular connection confirmation information. That is, the frame determination unit 20 references the contents of the information received from the transmit/receive unit 10 and determines whether or not that information is information transmitted from the other predetermined network relay device, and whether or not that information satisfies predetermined determination conditions.

Here, the frame determination unit 20 has a determination condition storage unit 200 for storing the determination conditions. The frame determination unit 20 stores, for example, information on a source that transmits the information (e.g. CCM) to be received by the network relay device 1. For example, the frame determination unit 20 determines whether or not the information received from the transmit/receive unit 10 is information addressed to the network relay device 1 with that frame determination unit 20, and when it is information addressed to the network relay device 1, references the determination condition storage unit 200 and determines whether or not that information satisfies predetermined determination conditions.

When the information received from the transmit/receive unit 10 is information addressed to the network relay device 1, and satisfies predetermined determination conditions, the frame determination unit 20 provides that information to the frame conversion unit 30. That is, the frame determination unit 20 determines that the CCM is particular connection confirmation information, when the destination identified by the DA is the network relay device 1 with that frame determination unit 20, and when the source identified by the SA is the predetermined external network relay device. The information the frame determination unit 20 received from the transmit/receive unit 10 is the particular connection confirmation information when the information received from the transmit/receive unit 10 is information addressed to that network relay device 1, and satisfies predetermined determination conditions.

On the other hand, when the information received from the transmit/receive unit 10 does not satisfy predetermined determination conditions, the frame determination unit 20 provides that information to the central control unit 60. That is, the frame determination unit 20 determines that the CCM is not particular connection confirmation information, when the destination identified by the DA is the network relay device 1 with that frame determination unit 20, and when the source identified by the SA is not the predetermined external network relay device. Further, when the information received from the transmit/receive unit 10 is not information addressed to the network relay device 1 with that frame determination unit 20, the frame determination unit 20 provides that information to the forwarding control unit 40.

Here, the determination conditions for determination condition storage unit 200 storing are as follows: The determination condition storage unit 200 stores the determination conditions, such as a SA, a VALN value in a S-TAG, and a MEP ID, etc. of another network relay device that transmits a CCM to be received by the network relay device 1 with that determination condition storage unit 200.

Frame Conversion Unit 30

When the frame determination unit 20 determines that the connection confirmation information, i.e. the CCM is particular connection confirmation information, the frame conversion unit 30 converts the contents of this particular connection confirmation information into predetermined information, to thereby generate return confirmation information. Specifically, the frame conversion unit 30 converts the CCM received in the transmit/receive unit 10 into a return CCM as return confirmation information, to return it to the network relay device, which is the source having transmitted the CCM, i.e. the maintenance end point (MEP). For example, the frame conversion unit 30 rewrites the SA of the CCM as a media access control (MAC) address of the network relay device 1 with that frame determination unit 20, and rewrites the MEP ID value into a particular setting value indicative of being a return CCM.

The frame conversion unit 30 provides its generated return CCM to the forwarding control unit 40. The network relay device 1, which returns a CCM received, such as the network relay device 1 in this embodiment, may be referred to as a return MEP.

Here, the frame determination unit 20 and the frame conversion unit 30 in this embodiment may each be constructed by use of an integrated circuit (i.e. hardware), such as an application specific integrated circuit (ASIC), a field programmable gate array (FPGA), or the like.

A modification to this embodiment may be provided with a second frame generation unit in place of the frame conversion unit 30. In this case, the second frame generation unit generates new return confirmation information when the frame determination unit 20 determines that the CCM is particular connection confirmation information. That is, unlike this embodiment, the modification does not rewrite the contents of the particular connection confirmation information, but causes the second frame generation unit to generate new return confirmation information. The second frame generation unit provides its generated new return confirmation information (i.e. generated new return CCM) to the forwarding control unit 40.

Forwarding Control Unit 40

The forwarding control unit 40 provides the return CCM to the predetermined external network relay device when the frame determination unit 20 determines that the CCM is particular connection confirmation information. Here, the predetermined external network relay device is, for example, the source identified by the SA stored in the determination condition storage unit 200. Specifically, the forwarding control unit 40 transmits the frame conversion unit 30 generated return CCM from the transmit/receive unit 10 to the predetermined external network relay device. For example, the forwarding control unit 40 has a forwarding database (FDB), which stores the information received from the frame determination unit 20, i.e. the information such as a destination address of the frame, an S-VID of the S-TAG, etc. The forwarding control unit 40 then forwards the information received from the frame determination unit 20 to a specified port of the transmit/receive unit 10 in response to the information stored in the FDB. The transmit/receive unit 10 then transmits the information received from the forwarding control unit 40 to the predetermined external network relay device.

Frame Generation Unit 50

The frame generation unit 50 is controlled by the central control unit 60, to generate a specified frame, such as an Ethernet OAM frame. The frame generation unit 50 then provides the generated frame to the forwarding control unit 40. The forwarding control unit 40 transmits the frame received from the frame generation unit 50, from the transmit/receive unit 10 to the predetermined external network relay device. For example, the frame generation unit 50 generates a CCM when the network relay device 1 is configured at the MEP that transmits the CCM. The frame generation unit 50 then provides the generated CCM to the forwarding control unit 40, and the forwarding control unit 40 transmits that CCM from the transmit/receive unit 10 as a multicast.

Central Control Unit 60

The central control unit 60 is equipped with software, which controls operation of the forwarding control unit 40, the frame generation unit 50, etc. Also, the central control unit 60 has a CCM administration information storage unit 600 as a CCM administration table. When receiving from the frame determination unit 20 the CCM sent to the network relay device 1 with the central control unit 60, the central control unit 60 stores specified information contained in that CCM in the CCM administration information storage unit 600.

Figure 3:
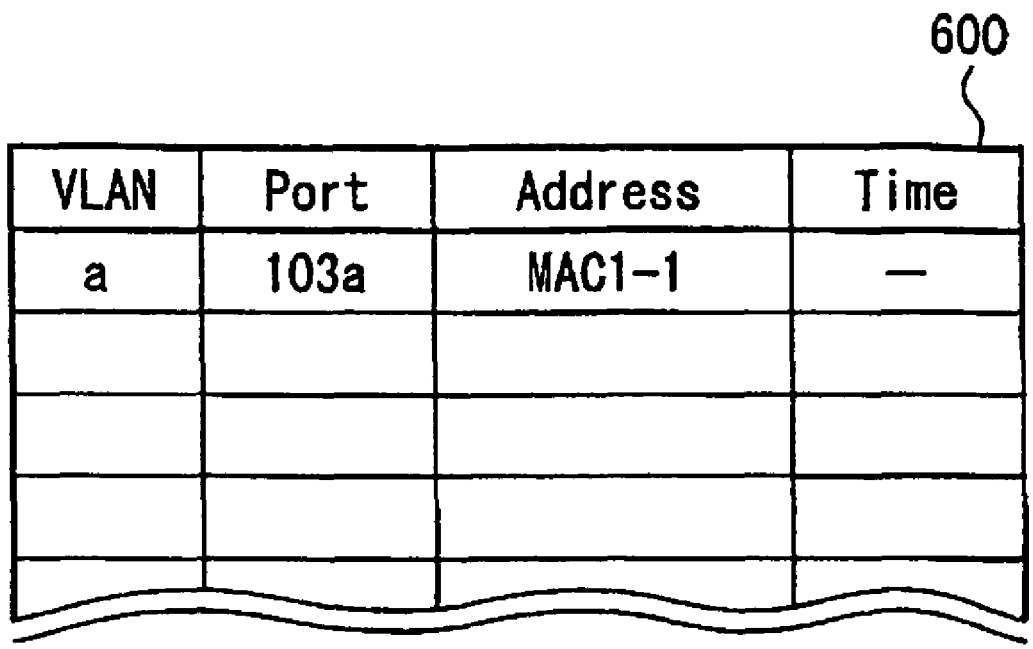
FIG. 3 is a diagram showing a data structure of a CCM administration information storage unit in the embodiment according to the invention.

FIG. 3 shows one example of a data structure of the CCM administration information storage unit in the embodiment according to the invention.

The CCM administration information storage unit 600 is controlled by the central control unit 60, to store each of a VLAN value (VLAN), a received port number (Port), a MAC address (Address) of the source having transmitted the CCM, and a time (Time) at which the network relay device 1 has received the CCM. When receiving the CCM, but no next CCM for a predetermined period of time from the point of having received that CCM, the central control unit 60 determines that a failure has occurred in the communication between the transmit side MEP and that network relay device 1.

Figure 4:
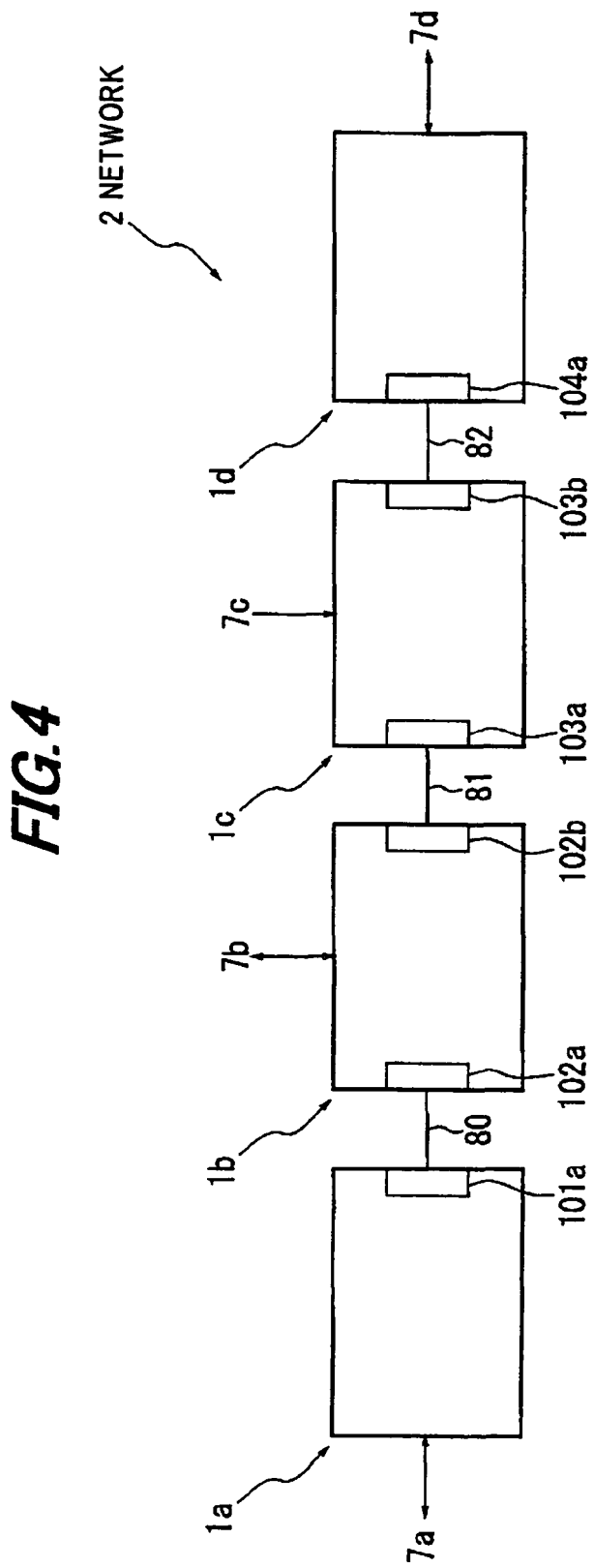
FIG. 4 is a diagram showing a construction of a network in the embodiment according to the invention.

FIG. 4 shows one example of a construction of a network in the embodiment according to the invention.

As one example of a network 2 in the embodiment according to the invention, there is described a network 2 with four network relay devices (i.e. network relay devices 1a to 1d). Although in the example shown in FIG. 4 are shown only the four network relay devices 1a to 1d, the number of network relay devices is not limited to four, but the network may be configured to include two, three, or five or more plural network relay devices.

Network 2 Configuration

In the network 2, a port 101a of the network relay device 1a is connected to a port 102a of the network relay device 1b by a transmission line 80. Also, a port 102b of the network relay device 1b is connected to a port 103a of the network relay device 1c by a transmission line 81. Further, a port 103b of the network relay device 1c is connected to a port 104a of the network relay device 1d by a transmission line 82. The network relay devices 1a to 1d are connected to external networks 7a-7d, respectively.

The network relay devices 1a to 1d included in the network 2 have substantially the same function and configuration as the network relay device 1 in this embodiment. The network relay devices 1a to 1d have an Ethernet OAM function. The network relay devices 1a to 1d are layer-2 switching hubs as one example, for relaying MAC frames.

Here, in this embodiment, the respective frame determination units 20 and frame generation units 50 of the network relay devices 1a to 1d are configured to operate the port 101a of the network relay device 1a as a CCM transmitting side MEP, the network relay device 1b as a maintenance intermediate point (MIP), and the port 103a of the network relay device 1c as a CCM receiving side MEP. Also, the port 104a of the network relay device 1d is operated as a CCM transmitting side MEP, and the port 103b of the network relay device 1c is operated as a return MEP. That is, the port 103b of the network relay device 1c is configured as the return maintenance end point, i.e. the return MEP with respect to the port 104a of the network relay device 1d. Because of being at the MIP, the network relay device 1b relays information from the network relay device 1a to 1c in such a manner that the information is transmitted through the network relay device 1b.

CCM Transmission from Network Relay Device 1a to 1c

FIG. 5A shows one example of flows of a network connection confirmation method in the embodiment according to the invention.

In FIG. 5A is described one example of a connection confirmation method for the network 2 described in FIG. 4. First, the determination condition storage unit 200 of the network relay device 1c stores each value of an SA, a VLAN value, and an MEP ID of a CCM transmitted from the port 104a as determination conditions. That is, the determination conditions are the contents of the CCM transmitted from the network relay device 1d to 1c (step S10).

The network relay device 1a transmits a CCM from its port 101a to the network relay device 1c at a predetermined time interval, i.e. at a regular interval (S12). That CCM contains each of a "multicast value" as a DA, a "MAC address of the port 101a" as an SA, an "a" as a VLAN, a "value preset for the network relay device 1a" as an MEP ID, and a "value preset for the network relay device 1a" as an MEG (=maintenance entity group) ID. Because of being at the MIP in the path from the network relay device 1a to 1c, the network relay device 1b relays the CCM transmitted by the network relay device 1a in such a manner that the CCM is transmitted through the network relay device 1b.

Subsequently, the network relay device 1c receives at the port 103a of its transmit/receive unit 10 the CCM transmitted by the network relay device 1a. The transmit/receive unit 10 of the network relay device 1c provides the received CCM to the frame determination unit 20 of the network relay device 1c. The frame determination unit 20 references the contents of the received CCM, and compares the determination conditions stored in its determination condition storage unit 200 and the referenced contents of the CCM. In this case, that CCM is that addressed from the network relay device 1a to 1c, and is therefore not set in the determination conditions, i.e. does not match the determination conditions. Thus, the frame determination unit 20 determines that that CCM is the frame transmitted to the network relay device 1c, and does not satisfy the determination conditions. The frame determination unit 20 then provides that CCM to the central control unit 60.

The central control unit 60 stores in its CCM administration information storage unit 600 each of a VLAN value, a received port number, a CCM source address, and a CCM receiving time, contained in the CCM received from the frame determination unit 20 (S14).

The central control unit 60 then determines whether or not a next CCM is received from the port 101a within a predetermined period of time (S16). When determining that the next CCM has been received from the port 101a within the predetermined period of time (S16: Yes), the central control unit 60 renews the CCM receiving time stored in its CCM administration information storage unit 600 and associated with that CCM. On the other hand, when determining that no next CCM has been received from the port 101a within the predetermined period of time (S16: No), the central control unit 60 senses that a communication failure has occurred between the ports 101a and 103a (S20).

CCM Transmission from Network Relay Device 1d to 1c

FIG. 5B shows one example of flows of a network connection confirmation method in the embodiment according to the invention.

In FIG. 5B is described one example of a connection confirmation method for the network 2 described in FIG. 4. First, the determination condition storage unit 200 of the network relay device 1c stores each value of an SA, a VLAN value, and an MEP ID of a CCM transmitted from the port 104a as determination conditions. That is, the determination conditions are the contents of the CCM transmitted from the network relay device 1d to 1c (step S20).

The network relay device 1d regularly transmits a CCM from its port 104a to the network relay device 1c (S22). That CCM contains each of a "multicast value" as a DA, a "MAC address of the port 104a" as an SA, an "b" as a VLAN, a "value preset for the network relay device 1d" as an MEP ID, and a "value preset for the network relay device 1d" as an MEG ID.

Subsequently, the network relay device 1c receives at the port 103b of its transmit/receive unit 10 the CCM transmitted by the network relay device 1d. The transmit/receive unit 10 of the network relay device 1c provides the received CCM to the frame determination unit 20 of the network relay device 1c. The frame determination unit 20 references the contents of the received CCM, and compares the determination conditions stored in its determination condition storage unit 200 and the referenced contents of the CCM. In this case, that CCM is that addressed from the network relay device 1d to 1c, and is therefore set in the determination conditions, i.e. satisfies the determination conditions. Thus, the frame determination unit 20 determines that that CCM is the frame transmitted to the network relay device 1c, and satisfies the determination conditions. The frame determination unit 20 then provides that CCM to the frame conversion unit 30.

The frame conversion unit 30 rewrites the SA of the received CCM as a MAC address of the port 103b, and rewrites the MEP ID as a value indicative of a return CCM, thereby converting the received CCM into the return CCM (S24). The frame conversion unit 30 then provides the return CCM to the forwarding control unit 40. The forwarding control unit 40 provides the return CCM to the port 103b of the transmit/receive unit 10. The transmit/receive unit 10 then transmits the return CCM from its port 103b to the network relay device 1d (S26).

The network relay device 1d receives the return CCM at its port 104a. The frame determination unit 20 of the network relay device 1d determines that this return CCM is the return CCM from the port 103b of the network relay device 1c, and provides that return CCM to the central control unit 60. The central control unit 60 stores the contents of the return CCM in its CCM administration information storage unit 600 (S28). The central control unit 60 receives the return CCM from the network relay device 1c within a predetermined period of time, i.e. at a regular interval, thereby confirming the return connection between the ports 103b and 104a (S30).

When the central control unit 60 of the network relay device 1d confirms the return connection between the ports 103b and 104a (S30: Yes), the central control unit 60 repeats this confirmation. On the other hand, when receiving no next CCM within the predetermined period of time passing from when having received the preceding return CCM, i.e. confirming no return connection between the ports 103b and 104a (S30: No), the central control unit 60 senses that a failure has occurred in the connection between the ports 103b and 104a (S32).

Advantages of the Embodiment

The network 2 with the network relay devices 1 in this embodiment allows a CCM from a predetermined network relay device to be processed by the central control unit 60, while allowing a CCM from a particular network relay device to be returned to that particular network relay device by the frame conversion unit 30 and the forwarding control unit 40, which are constructed of hardware. This allows the network 2 with the network relay devices 1 in this embodiment to reduce the number of CCMs to be processed by the central control unit 60, therefore reducing the load of the central control unit 60. Thus, the use of the network relay devices 1 in this embodiment allows the load of the central control unit 60 to be reduced even when the network relay devices 1 constitute a large scale network 2.

Example

Figure 6:
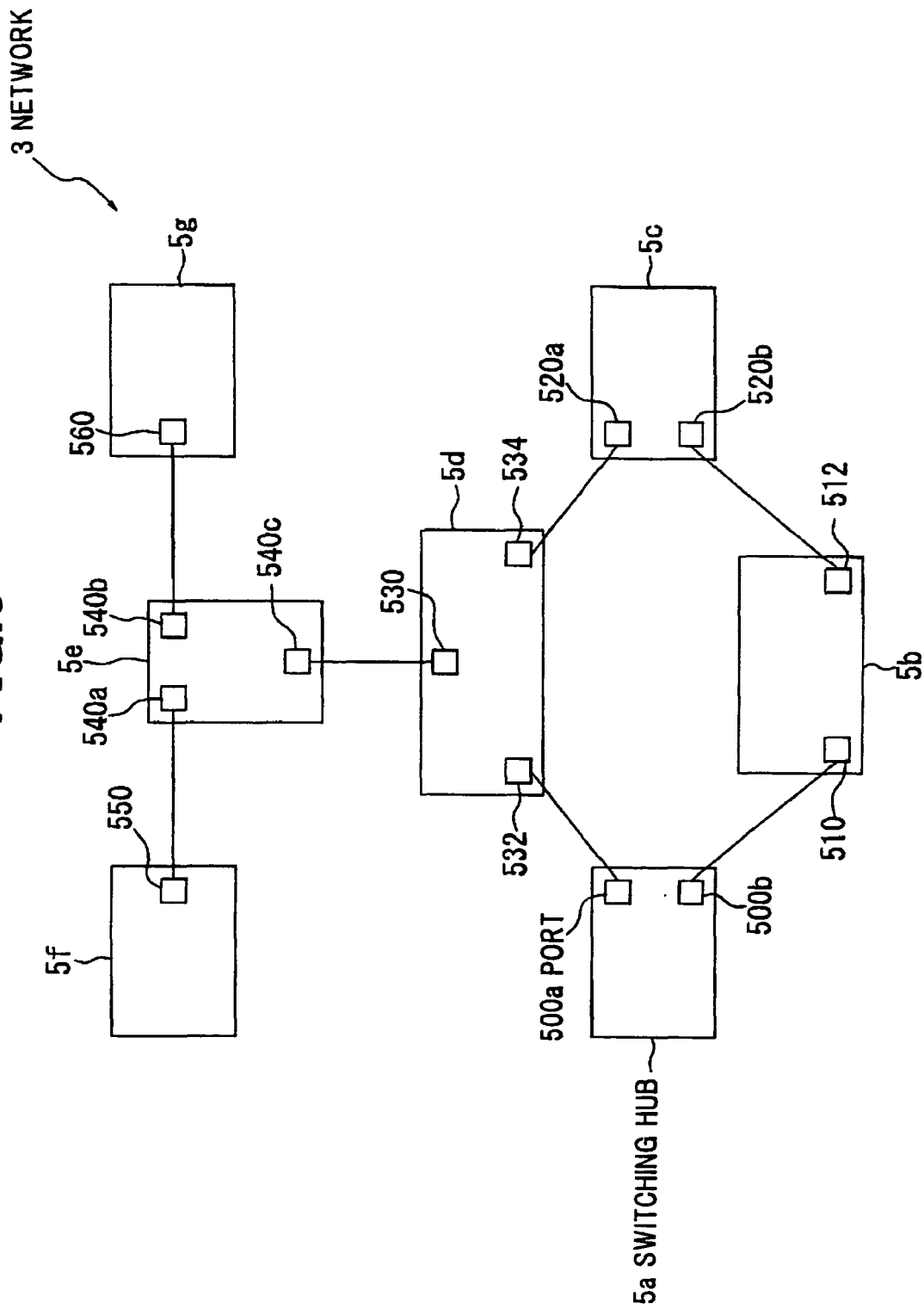
FIG. 6 is a diagram showing a construction of a network in an example according to the invention.

FIG. 6 shows a schematic construction of a network in an example according to the invention.

A network 3 in the example is configured to include a plurality of switching hubs. The plural switching hubs each have the function and configuration of the network relay device 1 in the embodiment. Specifically, the switching hubs 5a to 5g are layer-2 switching hubs. Each port of each of the switching hubs 5a to 5g may be configured to perform a plurality of functions for one port. For example, the switching hub 5b has ports 510 and 512, which may each be configured to perform a plurality of functions, such as normal MEP and return MEP functions. Also, the same applies to ports 530, 532, and 534 of the switching hub 5d, and a port 550 of the switching hub 5f, and a port 560 of the switching hub 5g.

With the Ethernet OAM continuity check function, the switching hub 5d implements the connectivity confirmation between its port 532 and the port 500a of the switching hub 5a, between its port 532 and the port 510 of the switching hub 5b, between its port 534 and the port 520a of the switching hub 5c, between its port 530 and the port 550 of the switching hub 5f, between its port 530 and the port 540c of the switching hub 5e, and between its port 530 and the port 560 of the switching hub 5g. For example, the switching hub 5d implements the connectivity confirmation directly between its port 532 and the port 500a of the switching hub 5a. On the other hand, the connectivity confirmation between the port 532 of the switching hub 5d and the port 510 of the switching hub 5b is implemented by transmitting a specified frame from the port 532 to 510, and relaying that frame from the switching hub 5a to the port 510 of the switching hub 5b. In this case, the switching hub 5a serves as the network relay device for simply relaying that frame.

Likewise, for example, the switching hub 5f implements the connectivity confirmation directly between its port 550 and the port 540a of the switching hub 5e. On the other hand, the connectivity confirmation between the port 550 of the switching hub 5f and the port 530 of the switching hub 5d is implemented by transmitting a specified frame from the port 550 to 530, and simply relaying that frame from the switching hub 5e to the port 530. The same applies to the other connectivity confirmation between the ports 534 and 512, and between the ports 530 and 560, for example.

With the continuity check function, the connectivity confirmation is implemented between the port 540a of the switching hub 5e and the port 550 of the switching hub 5f, between the port 540b of the switching hub 5e and the port 560 of the switching hub 5g, between the port 500b of the switching hub 5a and the port 510 of the switching hub 5b, and between the port 512 of the switching hub 5b and the port 520b of the switching hub 5c.

Here, the MEP ports 530 to 534 of the switching hub 5d are the CCM receiving side MEPs, and are configured to have the return MEP functions, respectively. Also, the port 530 is the CCM receiving side MEP, and is configured to have the normal MEP function. Also, the ports 540a to 540c of the switching hub 5e are all the receiving side MEPs, and are all configured to serve as the return MEPs.

This allows the switching hub 5d to perform the hardware processing to return CCMs from the port 500a of the switching hub 5a, the ports 510 and 512 of the switching hub 5b, and the port 520a of the switching hub 5c, respectively, of CCMs from the CCM transmitting side MEPs of the port 500a of the switching hub 5a, the ports 510 and 512 of the switching hub 5b, the port 520a of the switching hub 5c, the port 540c of the switching hub 5e, the port 550 of the switching hub 5f, and the port 560 of the switching hub 5g.

For the CCMs from the port 540c of the switching hub 5e, the port 550 of the switching hub 5f, and the port 560 of the switching hub 5g, respectively, the switching hub 5d performs the central control unit 60 processing to store specified information contained in these CCMs, into its CCM administration information storage unit 600. Accordingly, the number of CCMs to be processed by the central control unit 60 of the switching hub 5d is reduced, and the load in the CCM processing is therefore reduced. This allows the load of the central control unit 60 to be substantially reduced, in comparison to when all CCMs are processed by the central control unit 60.

Also, the switching hub 5e performs the hardware processing to return CCMs from the CCM transmitting side MEPs of the port 530 of the switching hub 5d, the port 550 of the switching hub 5f, and the port 560 of the switching hub 5g, respectively. This allows the CCM processing load of the central control unit 60 of the switching hub 5e to be relieved. The switching hub 5e is arranged at the center of the network, and there are therefore large amounts of data passed through the switching hub 5e. The central control unit 60 of the switching hub 5e then controls a plurality of protocols. The relieving of the CCM processing load of the central control unit 60 is therefore effective in reducing the load of the central control unit 60. Accordingly, the load of the switching hub 5e in the example is substantially reduced, in comparison to when the central control unit 60 performs other protocol control and CCM processing.

In this manner, the network 3 constituted by the switching hubs 5a to 5g in the example serving as the network relay devices is equipped with the continuity check function specified in ITU-T Y. 1731 and IEEE802.1ag, and has the maintenance end point, which returns and transmits a CCM received. This allows the switching hubs 5a to 5g of the network 3 to perform the hardware processing to return a received CCM without providing that CCM to the central control unit 60. The CCM processing load of the respective central control units 60 of the network relay devices with the CCM receiving side MEP can be reduced.

Although the invention has been described with respect to the above embodiments, the above embodiments are not intended to limit the appended claims. Also, it should be noted that not all the combinations of the features described in the above embodiments are essential to the means for solving the problems of the invention.

What is claimed is:

1. A network relay device, comprising:
   a device for receiving, from an external network relay device, connection confirmation information indicative of being in communication connection with the external network relay device, when no next connection confirmation information is received within a predetermined period of time, sensing that a communication failure has occurred between the external network relay device and an other external network relay device, and when the received connection confirmation information comprises a particular connection confirmation information comprising connection confirmation information transmitted from a predetermined external network relay device, generating a return confirmation information and forwarding the return confirmation information to the predetermined external network relay device, to return the received connection confirmation information to the network relay device to the predetermined external network relay device.

2. The network relay device according to claim 1, wherein said device comprises:
   a transmit/receive unit for transmitting/receiving the connection confirmation information;
   a frame determination unit for determining whether or not the connection confirmation information received in the transmit/receive unit comprises the particular connection confirmation information; and
   a forwarding control unit for, when the frame determination unit determines that the connection confirmation information comprises the particular connection confirmation information, providing the return confirmation information to the predetermined external network relay device.

3. The network relay device according to claim 2, wherein said device further comprises:
   a frame conversion unit for, when the frame determination unit determines that the connection confirmation information comprises the particular connection confirmation information, generating the return confirmation information from the particular connection confirmation information; and
   the forwarding control unit transmitting the return confirmation information generated by the frame conversion unit, from the transmit/receive unit to the predetermined external network relay device.

4. The network relay device according to claim 3, wherein the connection confirmation information comprises source identification information for identifying a source having transmitted the connection confirmation information, destination identification information for identifying a destination,
wherein, when the destination identified by the destination identification information comprises the network relay device, and the source identified by the source identification information comprises the predetermined external network relay device, the frame determination unit determines that the connection confirmation information comprises the particular connection confirmation information, and
wherein, when the destination identified by the destination identification information comprises the network relay device, and the source identified by the source identification information is not the predetermined external network relay device, the frame determination unit determines that the connection confirmation information is not the particular connection confirmation information.

5. The network relay device according to claim 4, wherein the frame determination unit and the frame conversion unit comprise hardware.

6. The network relay device according to claim 1, wherein said device further comprises:
an administration information storage unit for storing a receiving time of the connection confirmation information.

7. The network relay device according to claim 6, wherein, when the next connection confirmation information is received within the predetermined period of time, the receiving time stored in the administration information storage unit, which is associated with the connection confirmation information, is renewed.

8. The network relay device according to claim 1, wherein, when the received connection confirmation information comprises the particular connection confirmation information, the device generates the return confirmation information instead of rewriting contents of the particular connection confirmation information.

9. The network relay device according to claim 1, wherein the predetermined external network relay device comprises a source that is identified based on a media access control (MAC) address of a port.

10. A network connection confirmation method, comprising:
in a transmit/receive unit for transmitting/receiving connection confirmation information indicative of being in communication connection with an external network relay device, receiving the connection confirmation information;
sensing that a communication failure has occurred between the external network relay device and an other external network relay device, when no next connection confirmation information is received within a redetermined period of time;
determining whether the connection confirmation information received in the transmit/receive unit comprises a particular connection confirmation information comprising connection confirmation information transmitted from a predetermined external network relay device; and
when it is determined that the connection confirmation information comprises the particular connection confirmation information, generating a return confirmation information and forwarding the return confirmation information to the predetermined external network relay device, to return the received connection confirmation information to the predetermined external network relay device.

11. The network connection confirmation method according to claim 10, further comprising:
wherein, in said generating, the return confirmation information is generated from the particular connection confirmation information, and
wherein the return confirmation information includes transmitting the generated return confirmation information, from the transmit/receive unit to the predetermined external network relay device.

12. The network connection confirmation method according to claim 11, wherein the connection confirmation information comprises source network relay device identification information for identifying the external network relay device having transmitted the connection confirmation information, and destination network relay device identification information for identifying a destination network relay device,
wherein, when the destination network relay device identified by the destination network relay device identification information comprises the network relay device, and the source network relay device identification information comprises the predetermined external network relay device, it is determined that the connection confirmation information is the particular connection confirmation information, and
wherein, when the destination network relay device identified by the destination network relay device identification information comprises the network relay device, and the source network relay device identification information is not the predetermined external network relay device, it is determined that the connection confirmation information is not the particular connection confirmation information.

13. A network, comprising:
a plurality of connected network relay devices; and
one network relay device receiving connection confirmation information indicative of being in communication connection between the one network relay device and another network relay device, when no next connection confirmation information is received within a predetermined period of time, sensing that a communication failure has occurred between the one network relay device and said another network relay device, and when the received connection confirmation information comprises a particular connection confirmation information comprising connection confirmation information transmitted from a predetermined network relay device, generating a return confirmation information generated from the particular connection confirmation information and forwarding the return confirmation information to the predetermined external network relay device, to return the received connection confirmation information to the one network relay device to the predetermined network relay device.

* * * * *